United States Patent
Kennedy et al.

(10) Patent No.: US 10,590,789 B2
(45) Date of Patent: Mar. 17, 2020

(54) TURBOCHARGER RADIAL SEAL

(71) Applicant: BorgWarner Inc., Auburn Hills, MI (US)

(72) Inventors: Donald M. Kennedy, Asheville, NC (US); Augustine Cavagnaro, Flat Rock, NC (US); Daniel VanSaun, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/497,312

(22) Filed: Apr. 26, 2017

(65) Prior Publication Data

US 2018/0313220 A1 Nov. 1, 2018

(51) Int. Cl.
| | |
|---|---|
| *F01D 11/00* | (2006.01) |
| *F02B 33/40* | (2006.01) |
| *F02B 37/24* | (2006.01) |
| *F01D 25/16* | (2006.01) |
| *F01D 5/06* | (2006.01) |
| *F01D 9/04* | (2006.01) |

(52) U.S. Cl.
CPC ............ *F01D 11/003* (2013.01); *F01D 25/16* (2013.01); *F02B 33/40* (2013.01); *F02B 37/24* (2013.01); *F01D 5/06* (2013.01); *F01D 9/041* (2013.01); *F05D 2220/40* (2013.01)

(58) Field of Classification Search
CPC ............ F04B 39/0246; F04C 2240/601; F16J 15/3464; F04D 29/10; F16D 3/385
See application file for complete search history.

(56) References Cited

U.S. PATENT DOCUMENTS

| | | | | |
|---|---|---|---|---|
| 3,572,732 A | * | 3/1971 | Sekulich | F16J 15/3212 |
| | | | | 277/553 |
| 5,451,064 A | * | 9/1995 | Mercuri | F01N 13/1827 |
| | | | | 277/625 |
| 5,830,809 A | | 11/1998 | Howard et al. | |
| 5,981,072 A | | 11/1999 | Mercuri et al. | |
| (Continued) | | | | |

FOREIGN PATENT DOCUMENTS

| | | | | |
|---|---|---|---|---|
| EP | 2253816 B1 * | 2/2016 | | F02D 9/106 |

OTHER PUBLICATIONS

Exhaust Gas Temperature 1050° C. Simon, Pub. Sep. 2000: www.turbos.bwauto.com/tools/download.aspx?t=document&r=105&d=327.*

*Primary Examiner* — Phutthiwat Wongwian
*Assistant Examiner* — Edward Bushard
(74) *Attorney, Agent, or Firm* — Miller, Matthias & Hull LLP

(57) ABSTRACT

A variable turbine geometry (VTG) turbocharger is disclosed. The VTG turbocharger may comprise a turbine section having a turbine wheel and plurality of guide vanes configured to regulate a flow of exhaust gases to the turbine wheel. The VTG turbocharger may further comprise an actuation pivot shaft (APS) configured to mediate actuation of opening and closing of the guide vanes, a bushing rotatably supporting the APS with a clearance therebetween, and a radial seal circumscribing the APS and inserted in a cavity of the bushing. The radial seal may form an interference fit with both an outer diameter of the APS and an inner diameter of the bushing to seal a leakage of the exhaust gases between the clearance between the APS and the bushing.

16 Claims, 6 Drawing Sheets

(56) References Cited

U.S. PATENT DOCUMENTS

| | | | |
|---|---|---|---|
| 6,543,228 B2* | 4/2003 | Deacon | F02B 37/183 |
| | | | 137/527 |
| 6,669,919 B1 | 12/2003 | Greinke | |
| 8,066,950 B2 | 11/2011 | Newburry et al. | |
| 9,534,856 B2 | 1/2017 | Suzuki et al. | |
| 9,548,516 B2 | 1/2017 | Kubota et al. | |
| 10,215,088 B2* | 2/2019 | Kemona | F02B 37/186 |
| 2015/0097345 A1* | 4/2015 | House | F16J 15/186 |
| | | | 277/585 |
| 2016/0237838 A1* | 8/2016 | Kennedy | F01D 11/00 |

* cited by examiner

TURBOCHARGER RADIAL SEAL

TECHNICAL FIELD

The present disclosure generally relates to turbochargers and, more specifically, to radial seals for sealing leakage of exhaust gases from variable turbine geometry (VTG) turbochargers and wastegate turbochargers.

BACKGROUND

Turbochargers are used in numerous applications such as automotive, marine, and aerospace applications. Turbochargers may provide a pressure increase (or boost) in the intake air over atmospheric pressures to increase the power output of the engine. A turbocharger may include a turbine section having a turbine wheel, a compressor section having a compressor wheel, and a bearing section that houses a shaft interconnecting the turbine wheel and the compressor wheel. The turbine wheel may extract energy from exhaust gases to drive the compressor via the interconnecting shaft, while the compressor wheel may increase the pressure of intake air for delivery to the combustion chamber of the engine.

Some turbocharger designs may include a wastegate that opens to divert exhaust gases away from the turbine wheel to the exhaust system when the turbocharger boost reaches a pressure threshold. In contrast, variable turbine geometry (VTG) turbochargers may not require a wastegate. Instead, in VTG turbochargers, the turbine output may be regulated with guide vanes that surround the turbine wheel at the turbine inlet. The guide vanes may open and close to control the flow of exhaust gases onto the turbine wheel in order to maximize turbocharger boost under varying operating conditions.

A pneumatic or electronic actuator may control the opening and closing of the guide vanes via an actuation pivot shaft (APS) housed in the bearing section. The APS may be received in a bushing held in a bore of the bearing section, with a head end of the APS penetrating into the turbine section for exposure to high temperature and high pressure exhaust gases. A pre-defined clearance between the bushing and the APS may exist to allow tilting and rotation of the APS in the bushing, and to prevent binding of the APS in the bushing caused by thermal growth and/or corrosion buildup. However, the clearance between the APS and the bushing may provide a flow path for fugitive exhaust gases that have not been treated by the exhaust aftertreatment system to escape from the turbine section into the atmosphere.

Current VTG turbochargers may include piston rings that partially obstruct the leakage of exhaust gases through clearances in the APS/bushing assembly. Development of more effective seals that completely eliminate exhaust gas leakage is challenging, however, due to the high temperature and corrosive environment of the APS/bushing assembly which requires sealing materials with high temperature capabilities and resistance to corrosion. In addition, suitable seals should have a service life that matches the service life of the vehicle, and should be flexible enough to permit tilting and rotation of the APS in the bushing without compromising the effectiveness of the seal. The latter requirement precludes the use of some rigid face seals that may become unseated as the shaft tilts relative to the bushing.

U.S. Pat. No. 7,644,583 discloses a variable nozzle turbocharger (VNT) having a control rod received in a bushing that is involved in actuating rotation of the turbine vanes. The control rod/bushing assembly includes washers on one end of the bushing, and a spring on the other end of the bushing to seal exhaust gas leakage therethrough. While effective, there is still a need for improved seal designs that seal leakage of exhaust gases through the APS/bushing interface in VTG turbochargers.

SUMMARY

In accordance with one aspect of the present disclosure, a variable turbine geometry (VTG) turbocharger is disclosed. The VTG turbocharger may comprise a turbine section having a turbine wheel and a plurality of guide vanes surrounding the turbine wheel. The plurality of guide vanes may be configured to regulate a flow of exhaust gases to the turbine wheel by opening and closing. The VTG turbocharger may further comprise an actuation pivot shaft (APS) configured to mediate actuation of the opening and closing of the plurality of guide vanes. The APS may have an ambient side exposed to ambient air, and a pressure side penetrating the turbine section. The VTG turbocharger may further comprise a bushing rotatably supporting the APS with a clearance therebetween. The bushing may have a first end oriented toward the ambient side of the APS and a second end oriented toward the pressure side of the APS. In addition, the VTG turbocharger may further comprise a radial seal circumscribing the APS and forming an interference fit with an outer diameter of the APS. The radial seal may be configured to seal a leakage of the exhaust gases through the clearance between the APS and the bushing.

In accordance with another aspect of the present disclosure, a variable turbine geometry (VTG) turbocharger is disclosed. The VTG turbocharger may comprise a turbine section having a turbine wheel and a plurality of guide vanes surrounding the turbine wheel. The plurality of guide vanes may be configured to regulate a flow of exhaust gases to the turbine wheel by opening and closing. The VTG turbocharger may further comprise a compressor section, a bearing section between the turbine section and the compressor section, and an actuation pivot shaft (APS) configured to mediate actuation of the opening and closing of the plurality of guide vanes. The APS may have a shaft portion extending through the bearing section, and a head end penetrating into the turbine section. The VTG turbocharger may further comprise a bushing circumscribing the APS and rotatably supporting the shaft portion of the APS with a clearance therebetween. In addition, the VTG turbocharger may further comprise a radial seal press-fit into a cavity between an outer diameter of the shaft portion and an inner diameter of the bushing. The radial seal may be configured to seal a leakage of the exhaust gases through the clearance between the APS and the bushing. The radial seal may be formed from a material that elastically deflects to permit tilting, sliding, and rotation of the APS with respect to the bushing.

In accordance with another aspect of the present disclosure, a turbocharger is disclosed. The turbocharger may comprise a turbine section having a turbine housing enclosing a turbine wheel, and a wastegate in the turbine housing. The wastegate may be configured to allow exhaust gases to bypass the turbine wheel to an exhaust system when open. The turbocharger may further comprise an actuation shaft operatively associated with the wastegate and configured to mediate actuation of the opening and closing of the wastegate, and a bushing rotatably supporting the actuation shaft with a clearance therebetween. In addition, the turbocharger may further comprise a radial seal press-fit into a cavity between the bushing and the actuation shaft. The radial seal may circumscribe the actuation shaft and may be configured to seal a leakage of the exhaust gases through the clearance between the actuation shaft and the bushing. The radial seal may be formed from a material that elastically deflects to permit tilting, sliding, and rotation of the actuation shaft with respect to the bushing.

These and other aspects and features of the present disclosure will be more readily understood when read in conjunction with the accompanying drawings.

DETAILED DESCRIPTION

Figure 1:
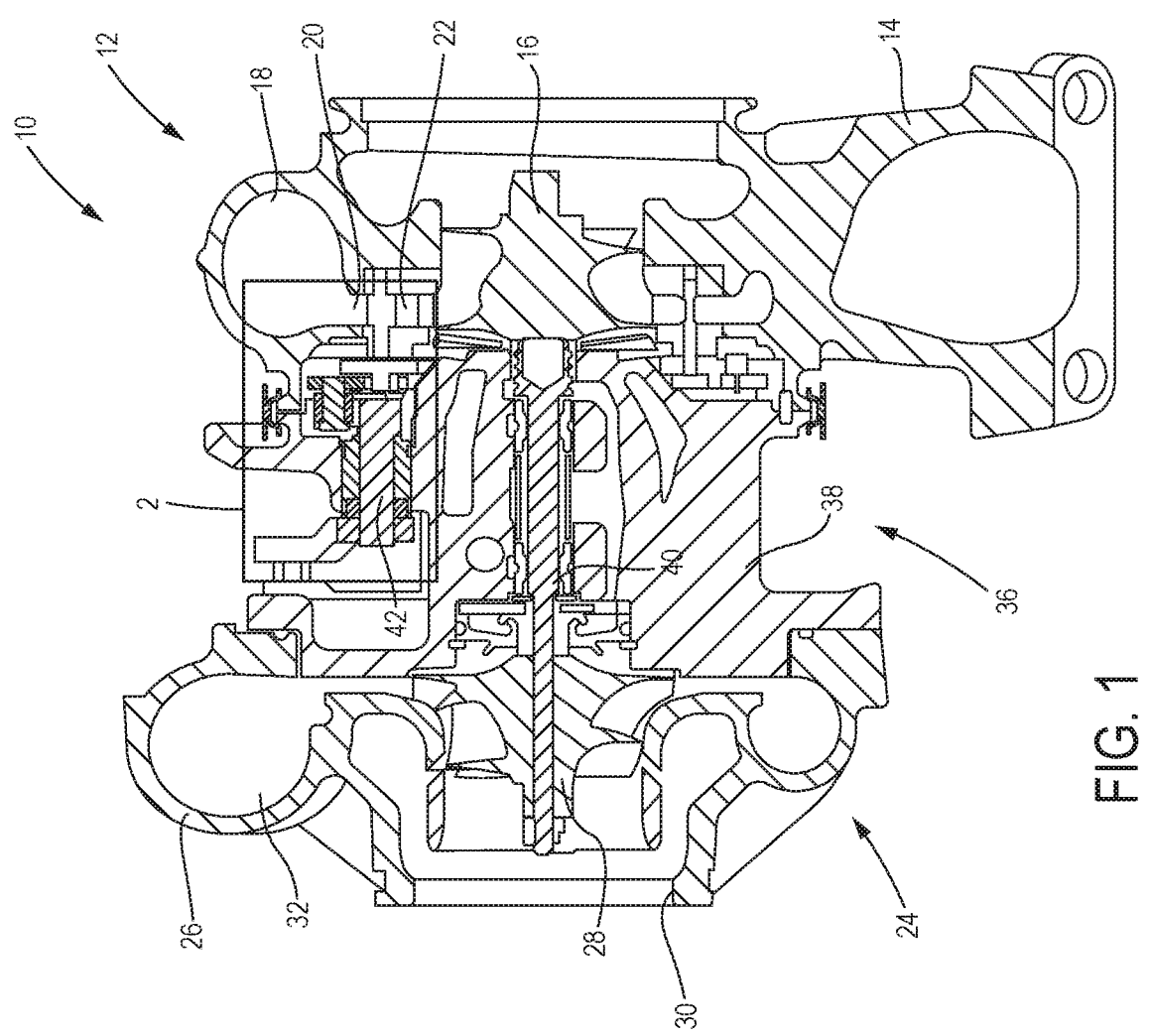
FIG. 1 is a cross-sectional view of a variable turbine geometry (VTG) turbocharger having a radial seal for sealing leakage of exhaust gases between an actuation pivot shaft (APS) and a bushing, constructed in accordance with the present disclosure.

Referring now to the drawings, and with specific reference to FIG. 1, a variable turbine geometry (VTG) turbocharger 10 is shown. As will be apparent to those skilled in the art, the VTG turbocharger 10 may operate by forcing more intake air into a combustion chamber of an internal combustion engine, allowing increased engine efficiency and power output. The turbocharger 10 may be a component of an automotive vehicle, although it may be used in other applications as well such as, but not limited to, marine or aircraft applications.

The VTG turbocharger 10 may include a turbine section 12 having a turbine housing 14 enclosing a turbine wheel 16. The turbine housing 14 may also define a volute 18 through which exhaust gases from the engine are channeled to the turbine wheel 16 via a throat 20. At the throat 20 of the volute 18 may be a plurality of guide vanes 22 that surround the turbine wheel 16 and open and close by various angles to regulate a flow of the exhaust gases to the turbine wheel 16. The VTG turbocharger 10 may further comprise a compressor section 24 having a compressor housing 26 enclosing a compressor wheel 28 and defining an air inlet 30 and a diffuser section 32. Between the turbine section 12 and the compressor section 24 may be a bearing section 36 having a bearing housing 38 that encloses a shaft 40 interconnecting the turbine wheel 16 and the compressor wheel 28.

Exhaust gases may enter the turbine section 12 through a turbine inlet and may flow to the turbine wheel 16 via the volute 18 and the throat 20, causing the turbine wheel 16 to rotate. Rotation of the turbine wheel 16 may, in turn, drive the rotation of the compressor wheel 28 via the interconnecting shaft 40. Rotation of the compressor wheel 28 may increase the velocity of the intake air, and the high velocity air may be expelled into the diffuser section 32 for delivery to the combustion chamber of the internal combustion engine.

The output of the turbocharger 10 under different operating conditions may be regulated by selective opening and closing of the guide vanes 22 of the turbine section 12. Actuation of the opening and closing of the guide vanes 22 may be mediated by an actuation pivot shaft (APS) 42 partially housed in the bearing section 36 (see FIG. 2). More specifically, a pneumatic or an electronic actuator may drive the movement of a lever 44 assembled on the APS 42 via an intermediate linkage. As a result, the lever 44 may drive the rotation of the APS 42 which, in turn, may drive the movement of a block/pin assembly 46 engaged with a head 48 of the APS (see FIG. 2). The block/pin assembly 46 may then drive the movement of an adjustment ring 50 that subsequently adjusts the angle of the guide vanes 22 via a vane lever 52. Accordingly, torque may be transmitted from the actuator to the guide vanes 22 via the APS 42.

Figure 2:
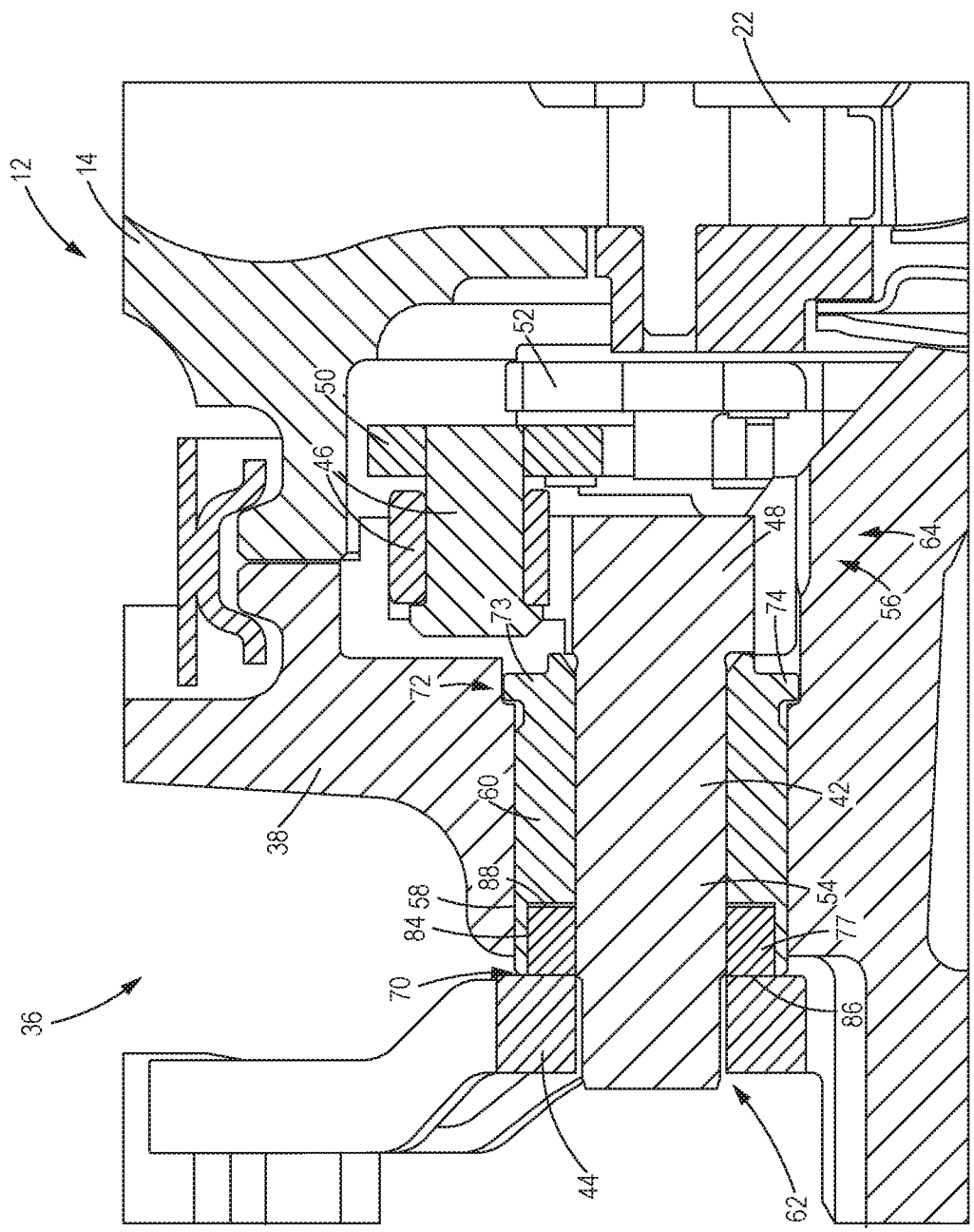
FIG. 2 is an expanded view of detail 2 of FIG. 1, illustrating an assembly of the APS, the bushing, and the radial seal, constructed in accordance with the present disclosure.

Referring to FIG. 2, the APS 42 may include a shaft portion 54 and a head end 56 having the head 48. The shaft portion 54 of the APS 42 may extend through a bore 58 of the bearing housing 38, and may be rotatably supported by at least one bushing 60. The bushing 60 may circumscribe the shaft portion 54 of the APS 42 with a clearance therebetween to allow rotation as well as subtle tilting and axial sliding of the APS 42 within the bushing 60. The head end 56 of the APS 42 may penetrate the turbine section 12 and, thus, may be exposed to hot exhaust gases in the turbine section 12. As such, the APS 42 may have a ambient side 62 exposed to cooler ambient air surrounding the bearing section 36, and a pressure side 64 at the head end 56 exposed to higher pressure and higher temperature exhaust gases from the turbine section 12. Additionally, the bushing 60 may have a first end 70 oriented toward the ambient side 62 of the APS 42, and a second end 72 oriented toward the pressure side 64 of the APS 42. In one arrangement, the second end 72 of the bushing 60 may have a flange 73 defining a head 74 of the bushing 60.

Figure 3:
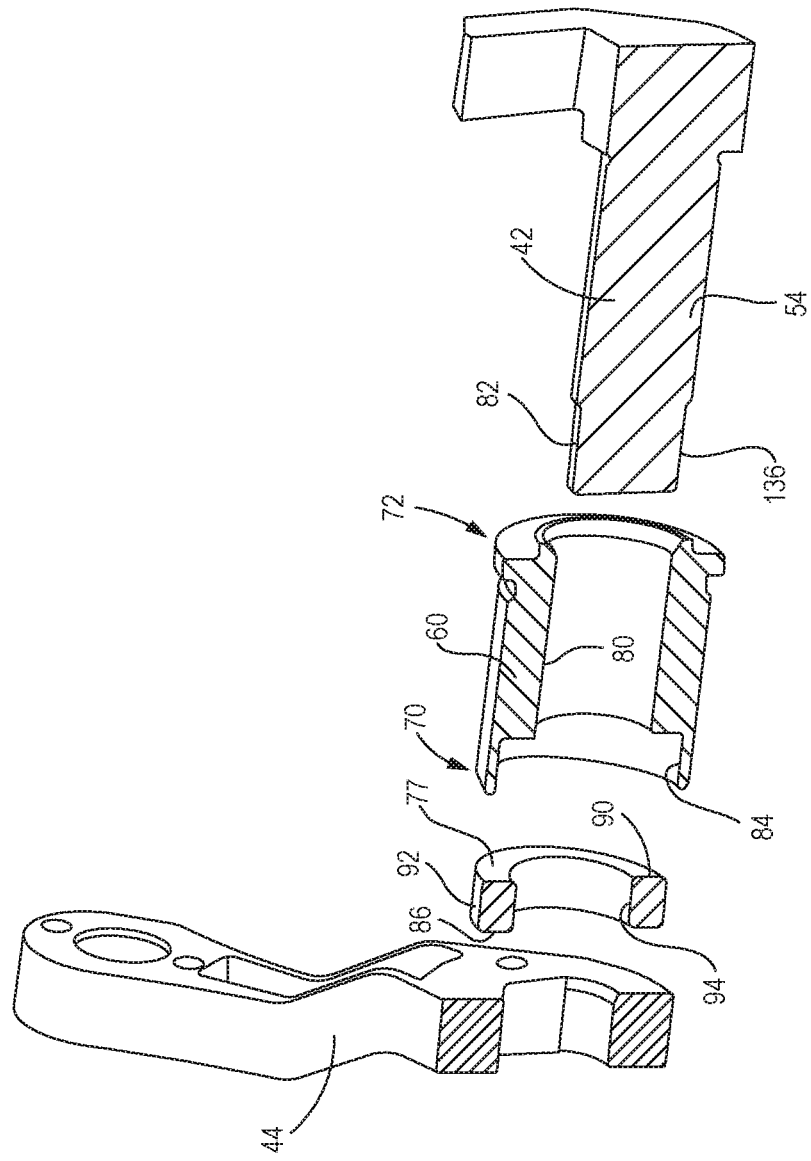
FIG. 3 is an exploded cross-sectional view of the assembly of FIG. 2, constructed in accordance with the present disclosure.

Referring to FIGS. 2-3, the turbocharger 10 may further include one or more radial seals 77 assembled with the APS 42 and the bushing 60 to seal the leakage of exhaust gases through the clearance between APS 42 and the bushing 60. More specifically, the radial seal 77 may circumscribe the APS 42 and may form an interference fit with both an inner diameter 80 of the bushing 60 and an outer diameter 82 of the shaft portion 54 to obstruct the leakage of the exhaust gases to the atmosphere through the APS 42/bushing 60 interface. As the exhaust gases that attempt to escape the turbine section 12 through the APS 42/bushing 60 interface have not been treated by the exhaust aftertreatment system, the seal 77 may prevent the leakage of pollutants (e.g., nitrogen oxides ($NO_x$), particulate matter, etc.) into the atmosphere. The seal 77 may be formed from an elastically deflectable material that maintains an effective seal while permitting the APS 42 to tilt, slide, and rotate with respect to the bushing 60.

The seal 77 may be received in a cavity 84 formed along the inner diameter 80 of the bushing 60 (see FIG. 3). In one arrangement, the cavity 84 may be located at the first end 70 of the bushing 60 oriented toward the ambient side 62 of the APS 42. In this configuration, a first side 86 of the seal 77 may rest against and contact the lever 44 that is assembled on the shaft portion 54 of the APS 42 (see FIG. 2). Alternatively, the cavity 84 may be located at the second end 72 of the bushing 60, or at a position between the first end 70 and the second end 72. The dimensions of the cavity 84 may directly correspond to or may be slightly larger than the dimensions of the seal 77. For instance, in one arrangement, the cavity 84 may be slightly larger than the seal 77 in the axial direction such that a gap 88 exists between a second side 90 of the seal 77 and the cavity 84 while the first side 86 of the seal 77 is flush with the first end 70 of the bushing 60 (see FIGS. 2-3). The cavity 84 may be formed along the inner diameter 80 of the bushing 60 by various methods such as machining.

As shown in FIG. 3, the seal 77 may have a ring structure with an outer diameter 92 and an inner diameter 94. When assembled with the APS 42 and the bushing 60, the outer diameter 92 of the seal 77 may form an interference fit with the inner diameter 80 of the bushing 60, and the inner diameter 94 of the seal 77 may form an interference fit with the outer diameter 82 of the shaft portion 54 of the APS. Furthermore, the strength of the interference fit between the seal 77 and the inner diameter 80 of the bushing 60 may be greater than the strength of the interference fit between the seal 77 and the outer diameter 82 of the shaft portion 54 to provide a slip interface between the seal 77 and the APS 42. The slip interface may obstruct leakage of exhaust gases while permitting the APS 42 to tilt, slide, and rotate with respect to the bushing 60. As opposed to prior art seals which only obstruct exhaust gas leakage by a fraction, the radial seal 77 of the present disclosure may completely or nearly completely block the leakage of the exhaust gases through the APS 42/bushing 60 interface.

Figure 4:
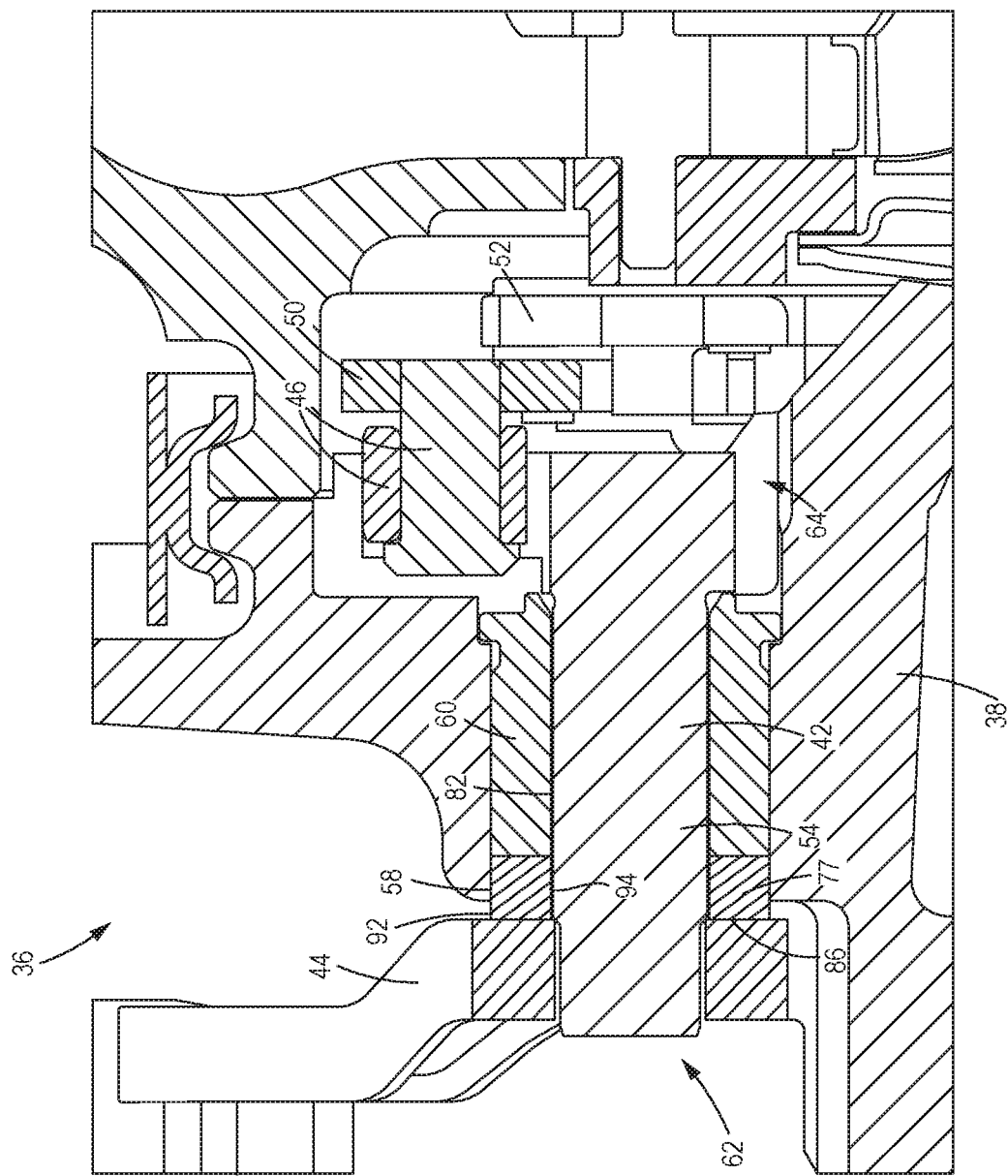
FIG. 4 is an expanded view similar to FIG. 2, but with the radial seal being mounted in a bore of the bearing housing, constructed in accordance with the present disclosure.

In an alternative arrangement, the radial seal 77 may be mounted directly in the bore 58 of the bearing housing 38 rather than in the bushing 60 (see FIG. 4). In this arrangement, the outer diameter 92 of the seal 77 may form an interference fit with the bore 58, and the inner diameter 94 of the seal 77 may form an interference fit with the outer diameter 82 of the APS 42. The interference fit between the radial seal 77 and the bore 58 may be stronger than the interference fit between the radial seal 77 and the APS 42 to provide the APS 42 with sufficient freedom to tilt, slide, and rotate with respect to the bushing 60. The radial seal 77 may be mounted in the bore 58 near the ambient side 62 of the APS 42 as shown in FIG. 4, although in other arrangements the seal 77 may be mounted near the pressure side 64 of the APS 42 or between the ambient side 62 and the pressure side 64. If mounted near the ambient side 62 as shown in FIG. 4, the first side 86 of the seal 77 may rest against and contact the lever 44.

In one embodiment, the seal 77 may be formed from a metal mesh that is impregnated with a flexible graphite material, such as Graphoil® flexible graphite. The Graphoil® flexible graphite may be formed by chemically treating natural graphite flake to form an intercalant between the layers of the graphite structure. The intercalant may then be rapidly heated to decomposition to provide a multi-fold expansion in size compared to the natural graphite flake material. The resulting Graphoil® material may be essentially pure graphite (at least 98% carbon by weight), and all or most of the chemicals added to the flake to promote expansion may be removed by the high temperature expansion process. In addition, the resulting Graphoil® material may have various properties suitable for use in the high temperature and corrosive environment of the APS 42/bushing 60 assembly. In particular, the Graphoil® material may be elastically deformable, compliant, resilient, and chemically resistant. Moreover, the Graphoil® material may be thermally stable and may exhibit minimal wear in the high temperature environment (e.g., about 300° C. to about 600° C.) of the APS 42/bushing 60 assembly. The metal mesh may be pressed into the ring structure of the seal 77, and may be subsequently injected with a slurry of the Graphoil® to provide the seal 77. The metal mesh may be formed from a corrosion-resistant metal or metal alloy, such as stainless steel. In alternative embodiments, however, the seal 77 may be formed from other suitable types of high temperature capable, corrosion resistant, and elastically deformable materials.

Figure 6:
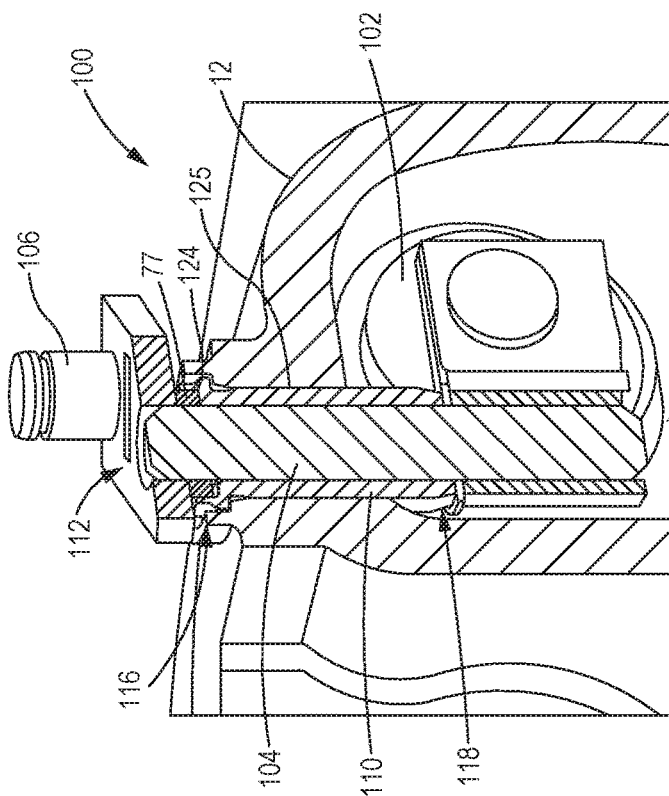
FIG. 6 is another cross-sectional view of a portion of the wastegate turbocharger of FIG. 4, constructed in accordance with the present disclosure.
Figure 5:
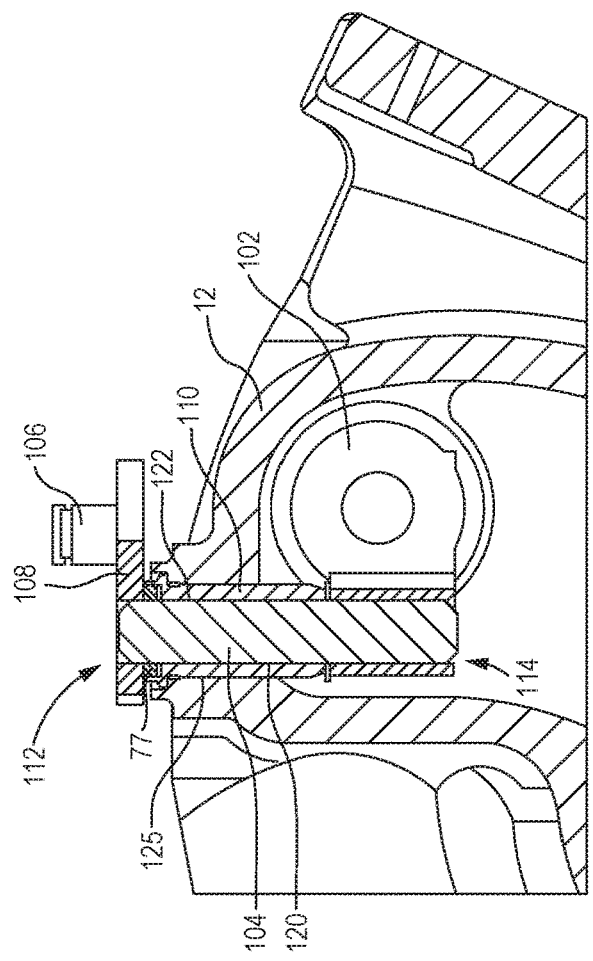
FIG. 5 is a cross-sectional view of a portion of a wastegate turbocharger having a radial seal for sealing leakage of exhaust gases between an actuation shaft and a bushing, constructed in accordance with the present disclosure.

In an alternative arrangement, the radial seal 77 may be used to seal leakage of exhaust gases from a turbocharger 100 having a wastegate 102, as shown in FIGS. 5-6. As will be understood by those with ordinary skill in the art, VTG turbochargers do not include a wastegate. Accordingly, it will be appreciated that the turbocharger 100 of FIGS. 5-6 is similar to the VTG turbocharger 10 of FIGS. 1-4 described above, but lacks the guide vanes 22 in the turbine section 12 and the components involved in actuating opening and closing of the guide vanes 22 (i.e., the lever 44, the APS 42, the block/pin assembly 46, the adjustment ring 50, etc.). Instead, the turbine section 12 of the turbocharger 100 of FIGS. 5-6 may include the wastegate 102 which allows exhaust gases to bypass the turbine wheel 16 to the downstream exhaust system when open. The wastegate 102 may be a flap valve that opens and closes to control the amount of exhaust gases that bypass the turbine wheel 16 to the exhaust system.

An actuation shaft 104 may be operatively associated with the wastegate 102 to mediate actuation of the opening and closing of the wastegate 102. Specifically, an actuator 106 may drive the rotation of a lever 108 assembled on the actuation shaft 104, and the lever 108 may drive the rotation of the actuation shaft 104 which may, in turn, drive the opening or closing of the wastegate 102. Like the APS 42 of the VTG turbocharger 10, the actuation shaft 104 may be received in and rotatably supported by a bushing 110 with a clearance therebetween to provide the actuation shaft 104 with freedom to tilt, slide axially, and rotate with respect to the bushing 110. In addition, the actuation shaft 104 may have an ambient side 112 exposed to ambient air, and a pressure side 114 exposed to higher pressure and higher temperature exhaust gases in the turbine section 12. Additionally, the bushing 110 may have a first end 116 oriented toward the ambient side 112 of the actuation shaft 104, and a second end 118 oriented toward the pressure side 114 of the actuation shaft 104 (see FIG. 5).

The radial seal 77 may circumscribe the actuation shaft 104 and form an interference fit with both an inner diameter 120 of the bushing 110 and the outer diameter 122 of the actuation shaft 104 (see FIG. 5). The strength of the interference fit between the seal 77 and the bushing 110 may be greater than the strength of the interference fit between the seal 77 and the actuation shaft 104 so that the interface between the actuation shaft 104 and the seal 77 is a slip interface that obstructs leakage of exhaust gases while permitting the actuation shaft 104 to tilt, slide, and rotate with respect to the bushing 110. The seal 77 may be received in a cavity 124 formed along the inner diameter 120 of the bushing 110 (see FIG. 6). The cavity 124 may be at the first end 116 of the bushing 110, allowing the seal 77 to rest against the lever 108 assembled on the actuation shaft 104.

However, in other arrangements the cavity 124 may be at the second end 118 of the bushing 110, or at a position between the first end 116 and the second end 118. In addition, in alternative embodiments, the seal 77 may be mounted in a bore 125 of the turbine section 12 rather than in the bushing 110, such that the seal 77 may form an interference fit with the bore 125 and the actuation shaft 104.

INDUSTRIAL APPLICABILITY

In general, the teachings of the present disclosure may find broad applicability in many industries including, but not limited to, automotive, marine, aerospace, and transportation industries. More specifically, the teachings of the present disclosure may find applicability in any industry having vehicles or machines that use VTG turbochargers or wastegate turbochargers.

Figure 7:
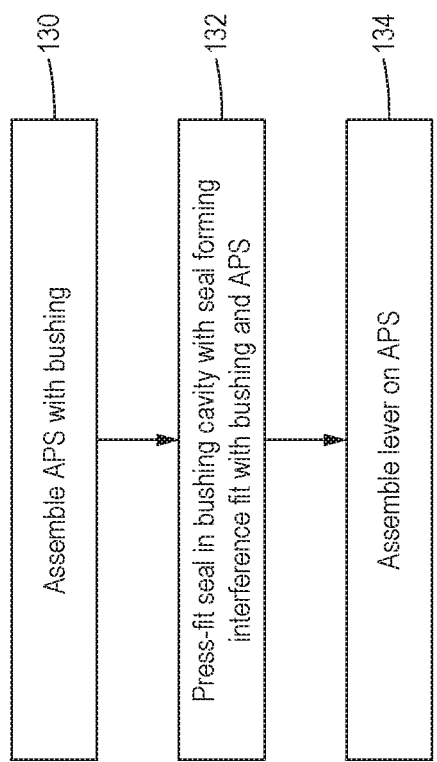
FIG. 7 is a flowchart of a series of steps that may be involved in assembling the radial seal with the APS and the bushing, in accordance with a method of the present disclosure.

Turning to FIG. 7, a method that may be used to assemble the radial seal 77 with the APS 42 and the bushing 60 of the VTG turbocharger 10 of FIGS. 1-3 is shown. The method may be adapted for assembling the radial seal 77 with the actuation shaft 104 and the bushing 110 of the wastegate turbocharger 100 of FIGS. 5-6. Beginning with a first block 130, the APS 42 may be assembled with the bushing 60 by inserting the shaft portion 54 of the APS 42 through the bushing 60. The block 130 may be carried out while the bushing 60 is retained in the bore 58 of the bearing section 36. At a next block 132, the radial seal 77 may be press-fit into the cavity 84 of the bushing 60 so that the seal 77 forms an interference fit with the bushing 60 and the APS 42. Alternatively, the radial seal 77 may be press-fit into the bore 58 so that the seal forms an interference fit with the bore 58 and the APS 42 (see FIG. 4). The lever 44 may then be assembled on the shaft portion 54 of the APS 42, such as by press-fitting the lever 44 on a narrower diameter portion 136 of the shaft portion 54 (see FIG. 3).

The radial seal of the present disclosure forms interference fits with the APS and the bushing to obstruct the leakage of exhaust gases to the atmosphere through the APS/bushing interface. Compared to piston seals of the prior art which only partially reduce the leakage of exhaust gases, the seal disclosed herein eliminates or nearly eliminates the leakage of fugitive exhaust gases to the atmosphere through the APS/bushing interface. The seal is formed from an elastically deflectable material that provides the APS with freedom to tilt, slide, and rotate with respect to the bushing while maintaining an effective seal. Moreover, the seal is capable of withstanding the high temperature and corrosive environment of the APS/bushing assembly without wearing out over extended operation periods. The seal of the present disclosure provides a cost-effective approach to seal exhaust gas leakage between actuation shaft and bushing interfaces in both VTG and wastegate turbochargers.

What is claimed is:

1. A variable turbine geometry (VTG) turbocharger, comprising:
   a turbine section having a turbine wheel and a plurality of guide vanes surrounding the turbine wheel, the plurality of guide vanes being configured to regulate a flow of exhaust gases to the turbine wheel by opening and closing;
   a compressor section;
   a bearing section between the turbine section and the compressor section;
   an actuation pivot shaft (APS) extending through a bore of the bearing section and configured to mediate actuation of the opening and closing of the plurality of guide vanes, the APS having an ambient side exposed to ambient air and a pressure side penetrating the turbine section;
   an actuator lever fixed to the APS;
   a bushing received in the bore and rotatably supporting the APS with a clearance therebetween, the bushing having a first end oriented toward the ambient side of the APS, and a second end oriented toward the pressure side of the APS; and
   a radial seal circumscribing the APS and a inner diameter of the radial seal forming an interference fit with an outer diameter of a shaft portion of the APS, the radial seal having a radially extending first side facing the ambient side and a radially extending second side facing the pressure side, and being configured to seal a leakage of the exhaust gases through the clearance between the APS and the bushing;
   wherein the bushing includes a cavity defining the first end of the bushing, wherein the radial seal is supported within the cavity and forms an interference fit with the bushing;
   wherein the radially extending first side of the radial seal is in contact with the actuator lever; and
   wherein the radially extending second side of the radial seal and the cavity define an axial gap.

2. The VTG turbocharger of claim 1, wherein the radial seal is configured to permit the APS to tilt, slide, and rotate with respect to the bushing.

3. The VTG turbocharger of claim 1, wherein the radial seal is formed from an elastically deflectable material.

4. The VTG turbocharger of claim 1, wherein the radial seal is formed from a metal mesh ring impregnated with flexible graphite.

5. The VTG turbocharger of claim 1, wherein the radial seal is inserted between the APS and the bore, and wherein the radial seal forms an interference fit with the bore.

6. The VTG turbocharger of claim 5, wherein a strength of the interference fit between the radial seal and the outer diameter of the APS is weaker than a strength of the interference fit between the radial seal and the bushing.

7. A variable turbine geometry (VTG) turbocharger, comprising:
   a turbine section having a turbine wheel and a plurality of guide vanes surrounding the turbine wheel, the plurality of guide vanes being configured to regulate a flow of exhaust gases to the turbine wheel by opening and closing;
   a compressor section;
   a bearing section between the turbine section and the compressor section;
   an actuation pivot shaft (APS) configured to mediate actuation of the opening and closing of the plurality of guide vanes, the APS having a shaft portion extending through the bearing section, and a head end penetrating into the turbine section;
   an actuator lever fixed to the APS;
   a bushing circumscribing the APS and rotatably supporting the shaft portion of the APS with a clearance therebetween, the bushing having a first end oriented toward an ambient pressure, and a second end oriented toward a pressure side;
   a radial seal press-fit into a cavity between an outer diameter of the shaft portion and an inner diameter of the bushing, an inner diameter of the radial seal forming an interference fit with the outer diameter of the shaft portion, the radial seal having a radially extending first side oriented toward the ambient pressure and a radially extending second side oriented toward the pressure side, and being configured to seal a leakage of the exhaust gases from the pressure side to the ambient pressure through the clearance between the APS and the bushing, the radial seal being formed from a material that elastically deflects to permit tilting, sliding, and rotation of the APS with respect to the bushing;

wherein the bushing includes the cavity, wherein the cavity defines the first end of the bushing, wherein the radial seal is supported within the cavity and forms an interference fit with the bushing;

wherein the radially extending first side of the radial seal is in contact with the actuator lever; and wherein the radially extending second side of the radial seal and the cavity define an axial gap.

8. The VTG turbocharger of claim 7, wherein the material is a metal mesh ring impregnated with flexible graphite.

9. The VTG turbocharger of claim 8, wherein the flexible graphite is formed by treating graphite with an intercalant followed by heat treating the graphite to decompose the intercalant and expand the graphite.

10. The VTG turbocharger of claim 8, wherein the metal mesh ring impregnated with the flexible graphite is stable at temperatures up to about 600° C.

11. The VTG turbocharger of claim 8, wherein the radial seal includes a ring structure having an outer diameter and an inner diameter, the outer diameter of the radial seal forming an interference fit with the inner diameter of the bushing, and the inner diameter of the radial seal forming an interference fit with the outer diameter of the shaft portion of the APS.

12. The VTG turbocharger of claim 11, wherein the interference fit between the outer diameter of the radial seal and the inner diameter of the bushing has a first strength, wherein the interference fit between the inner diameter of the radial seal and the outer diameter of the shaft portion has a second strength, and wherein the first strength is greater than the second strength.

13. The VTG turbocharger of claim 12, wherein the bushing includes a first end and a second end, and wherein the second end is oriented toward the head end of the APS.

14. The VTG turbocharger of claim 13, wherein the cavity is machined into the first end of the bushing.

15. A turbocharger, comprising:
a turbine section having a turbine housing enclosing a turbine wheel;
a wastegate in the turbine housing, the wastegate being configured to allow exhaust gases to bypass the turbine wheel to an exhaust system when open;
an actuation shaft operatively associated with the wastegate, the actuation shaft being configured to mediate actuation opening and closing of the wastegate;
a bushing rotatably supporting the actuation shaft with a clearance therebetween, the bushing having a first end oriented toward an ambient pressure, and a second end oriented toward a pressure side of the turbine housing; and
a radial seal press-fit into a cavity between the bushing and the actuation shaft, an inner diameter of the radial seal forming an interference fit with the outer diameter of the shaft portion, the radial seal having a radially extending first side oriented toward the ambient pressure and a radially extending second side oriented toward the pressure side, and circumscribing the actuation shaft and being configured to seal a leakage of the exhaust gases from the pressure side to the ambient pressure through the clearance between the actuation shaft and the bushing, the radial seal being formed from a material that elastically deflects to permit tilting, sliding, and rotation of the actuation shaft with respect to the bushing;
wherein the bushing includes the cavity, wherein the cavity defines the first end of the bushing, wherein the radial seal is supported within the cavity and forms an interference fit with the bushing; and
wherein the radially extending first side of the radial seal is in contact with an actuation lever; and
wherein the radially extending second side of the radial seal and the cavity define an axial gap.

16. The turbocharger of claim 15, wherein the radial seal is formed from a metal mesh ring impregnated with flexible graphite.

* * * * *